United States Patent Office 3,447,294
Patented June 3, 1969

3,447,294
IMPLEMENTS FOR WORKING CROP LYING ON THE GROUND
Cornelis van der Lely, 7 Bruschenrain, Zug, Switzerland
Filed Nov. 17, 1965, Ser. No. 517,200
Claims priority, application Netherlands, Dec. 4, 1964, 6414089; June 8, 1965, 6507236
Int. Cl. A01d 79/02
U.S. Cl. 56—372                    15 Claims

ABSTRACT OF THE DISCLOSURE

An agricultural implement with a frame having two or more portions, a rotatable crop working member mounted on each portion to rotate about an axis of rotation, the portions being pivotally connected to one another to pivot about an axis substantially parallel to the direction of travel, one or more ground wheels located on each side of the axis of rotation of the working members when the implement is viewed from the side.

---

This invention relates to implements for working crop lying on the ground, such implements being of the kind comprising at least two frame portions that are located, during use of the implement and viewed in the direction of travel thereof at such time, substantially wholly side-by-side and that are arranged so as to be pivotable relative to one another about one or more axes that extend transverse to the widths of the frame portions, each such frame portion including at least one member for working crop, which is rotatable about an axis of rotation.

According to the invention, there is provided an implement of the kind set forth, wherein each frame portion includes at least one ground wheel, the ground wheels being arranged in such a way that, viewed transverse to the direction of travel, at least one ground wheel is located to one side of the axis of rotation of the member for working crop and at least one ground wheel to the opposite side thereof.

For a better understanding of the invention, and to show how the same may be carried into effect, reference will now be made, by way of example, to the accompanying drawings, in which.

Referring to the drawings, the tedder has a frame comprised by three portions 1, 2 and 3. The central frame portion 2 is provided at its leading side with a frame beam 4 of tubular formation and circular cross-section, the frame beam 4 extending substantially horizontally and having the leading ends of two further frame beams 5 rigidly secured to its opposite ends. The frame beams 5 project substantially horizontally to the rear from the frame beam 4 and are perpendicular to the frame beam 4. Each frame beam 5 is of channel-shaped cross-section and the two beams 5 are disposed in such a way that the open sides thereof face away from one another towards the frame portions 1 and 3 respectively. As can be seen best in FIGURE 6 of the drawings, the two limbs of each frame beam 5 are substantially horizontally disposed but have edge regions bent over in relatively opposite directions so that both edge regions are contained in a single substantially vertical plane. Each frame beam 5 has a forked supporting bracket 6 that can be seen best in FIGURES 3 and 4 of the drawings secured to its leading end adjacent the frame beam 4. The substantially horizontal limbs of each bracket 6 have a corresponding vertical shaft 7 turnably entered through vertically aligned holes formed therein, rings 8 being secured to each shaft 7 above and below the corresponding bracket 6 to prevent axial displacement of the shafts relative to the brackets. The lowermost ends of the two shafts 7 are integrally connected by arms 9 to horizontal axles upon which ground wheels 10 are rotatably mounted. Since the longitudinal axes of the shafts 7 do not intersect those of the axles that have just been mentioned, the ground wheels 10 are castor wheels.

The free ends of the limbs of a U-shaped support 11 (FIGURE 1) are rigidly secured to the leading side of the frame beam 4 at the center of that frame beam. The limbs of the support 11 are vertically disposed and one end of a drawbar 12 is pivotally mounted between them with the aid of a horizontal pin 13. The base of the U-shaped support 11 carries a stop (not visible) against which bears the tip of a screw-threaded spindle 14 whose screw-threaded shank is entered through a correspondingly threaded sleeve fastened transversely in the drawbar 12 above the aforementioned stop. It will be evident that the axial setting of the spindle 14 in the aforementioned sleeve determines the angular setting of the drawbar 12 about the pivot pin 13.

Figure 2:
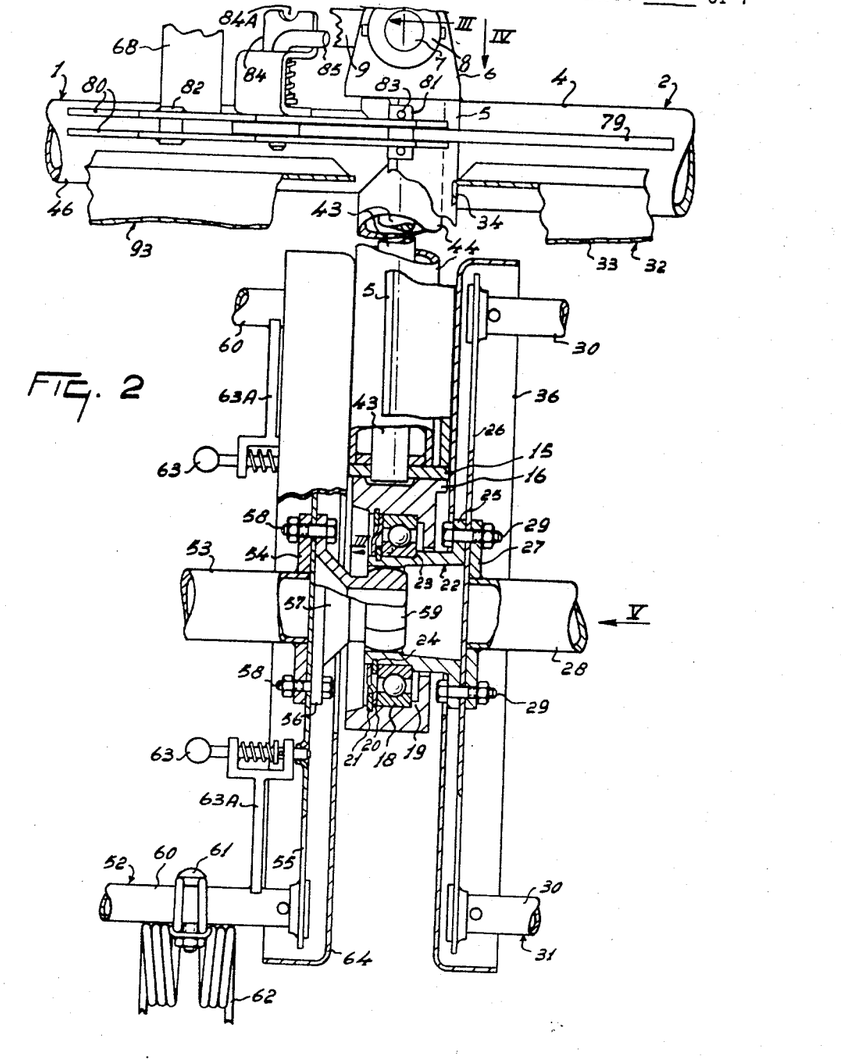
FIGURE 2 is a part-sectional plan view, to an enlarged scale, showing the junction between two frame portions of the tedder of FIGURE 1 and associated parts in greater detail.

The ends of the two frame beams 5 that are remote from the frame beam 4 have plates 15 (FIGURES 2, 3 and 6) secured to them. Each plate 15 has a corresponding housing 16 fastened to it with the aid of four bolts 17. Each housing 16 accommodates a corresponding self-adjusting ball bearing 18. As can be seen in FIGURE 2 of the drawings, one side of the outer race of each ball bearing 18 abuts against a shoulder 19 of the corresponding housing 16 whilst the other side of the same race bears against an annular dust cover 20. The dust cover 20 is sandwiched between the ball bearing 18 and a circlip 21 whose radially outermost edge is lodged in a groove formed inside the housing 16. The inner race of each ball bearing 18 carries a corresponding holder 22 and is sandwiched between a shoulder 23 of said holder and a second circlip 24 whose radially innermost edge is entered in a groove formed on the outermost surface of the holder 22.

Each holder 22 has a flange 25 against which a thin circular plate 26 abuts. The plate 26 is sandwiched between the flange 25 and the flange 27 of a tube 28 by four bolts 29. The longiutdinal axis of the tube 28 coincides with that of the holder 22 and the center of the ball bearing 18. The tube 28 extends parallel to the frame beam 4 and its opposite end is connected to the other frame beam 5 in a symmetrically identical manner to that illustrated in FIGURE 2.

Figure 1:
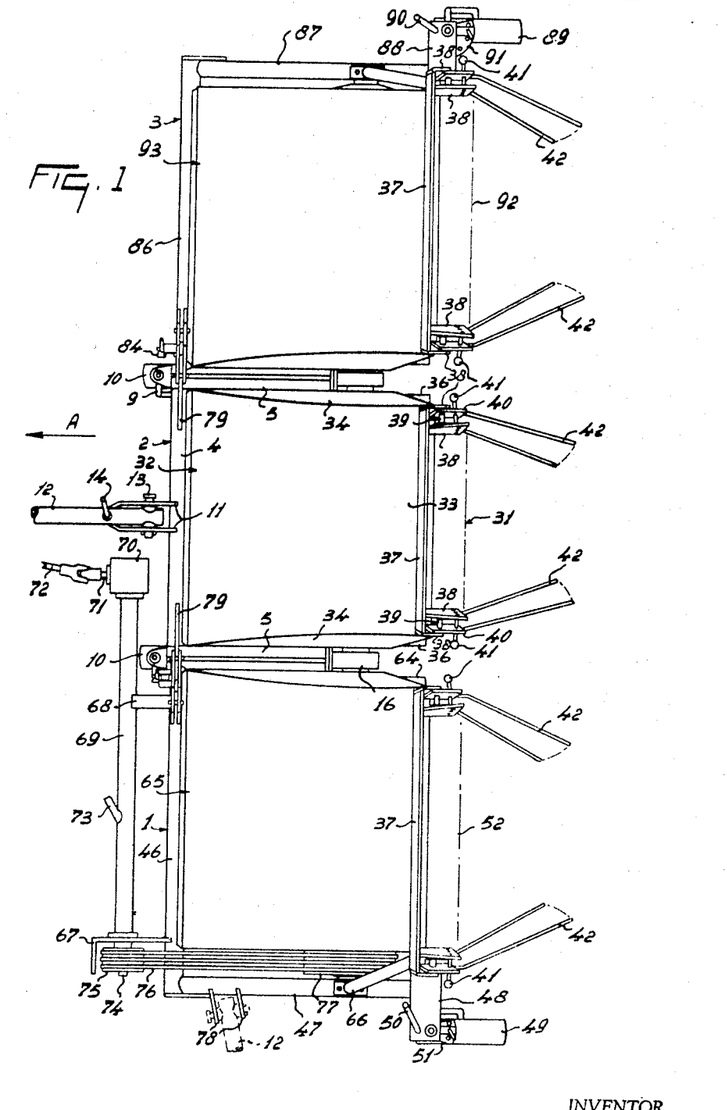
FIGURE 1 is a plan view of a tedder in accordance with the invention.

Each of the plates 26 is formed near its periphery with a series of holes and tubular tine supports 30 that extend parallel to the tube 28 are lodged in said holes. The tube 28, the plates 26 and the tine supports 30 together form a drum-shaped body 31 which is partly surrounded by a hood-shaped baffle 32 (FIGURE 1). The baffle 32 has a curved wall 33 the center of curvature of which approximately coincides with the axis of rotation of the body 31 afforded by the centerline of the tube 28. In addition to the curved wall 33, the baffle 32 has two opposite side walls 34 upper portions of which converge upwardly towards one another. The remaining portions of the side walls 34 are vertically disposed and the junctions between the former and latter portions are located at approximately the same level as the uppermost extremities of the plates 26. The upper inclined portion of each side wall 34 is contained in a plane inclined at an angle of about 10° to a vertical plane extending perpendicular to the tube 28. The leading edge of the baffle 32 is supported by the frame beam 4 and the rearmost edges of its side walls 34 are supported by tubular beams 35 (FIGURE 4) the lowermost ends of which are secured to plates 36 (FIGURES 2, 4 and 6) which are themselves fastened to the corresponding beams 5. As can be seen in FIGURE 2 in respect of one of the plates 36, said plates are located at a short distance from, and are parallel to, the corresponding plates 26. The outermost edge of each plate 36 is perpendicularly bent over towards the center of the body 31 so that the two plates 26 and the portions of the tine supports 30 that are entered through the latter are surrounded by said plates 36.

The rearmost edge of the curved wall 33 of the baffle 32 has a beam 37 of L-shaped cross-section secured to it so as to extend parallel to the tube 28. Pairs of larger and smaller relatively parallel plates 38 are fastened to each end of the beam 37 and each pair is formed with holes in which a corresponding pivot pin 39 is mounted. Each pivot pin 39 is contained in a vertical plane extending parallel to the tube 28 but is arranged in such a way that its own longitudianl axis is inclined at an angle of approximately 20° to the horizontal. The uppermost end of each pivot pin 39 is located closer (in plan view) to the center of the body 31 than is the lowermost end thereof. Supporting members 40 are turnably mounted on the two pivot pins 39 between the two plates 38 of each pair. Each supporting member 40 carries a corresponding locking pin 41 the tip of which is arranged so that it can be entered in any chosen one of a number of holes formed in the larger of the corresponding two plates 38 at equal distances from the corresponding pivot pin 39. The hole chosen for co-operation with the locking pin 41 determines the angular setting of the supporting member 40 about the pivot pin 39. Each supporting member 40 carries a corresponding guide member for crop discharged by the body 31 during use of the tedder. Each guide member takes the form of a plurality of spring steel guide rods 42 which, viewed from the rear of the tedder in the intended direction of operative travel A (FIGURE 1) thereof, are located one above the other with the uppermost rod 42 inclined to a horizontal plane at a smaller angle than the lowermost rod 42. The rods 42 are regularly spaced apart and have lengths such that the distances between the free ends of the rods are approximately equal to one another. When seen in plan view, each rod 42 is inclined to the tube 28 at a larger angle than the rod 42 immediately below it, the lowermost rod 42 being located closest to the body 31.

The webs of the forked supporting brackets 6 and the relatively parallel plates 15 are formed with holes in which two shafts 43 (FIGURES 2, 3, 4 and 6) are journalled so as to extend parallel to the corresponding two beams 5. Each shaft 43 is disposed between one of the vertical shafts 7 and the corresponding housing 16 in such a way that said shafts 43 cannot move axially. Each shaft 43 is surrounded by a corresponding tubular beam 44 of circular cross-section the longitudinal axis of which is coincident with that of the beam 44 which it surrounds. As can be seen best in FIGURE 3 of the drawings, washers 45 are secured in the mouth of each end of each tubular beam 44, the shafts 43 being entered through the central apertures of the washers 45 which latter are turnable about the shafts 43. It can be seen from FIGURE 6 of the drawings that each tubular beam 44 is located partly within the channel defined by the cross-section of the corresponding beam 5.

The tubular beam 44 which is located to the left-hand side of the body 31 when the tedder is viewed from the rear in the direction A indicated in FIGURE 1 forms part of the frame portion 1. A tubular frame beam 46 is secured to the leading end of the beam 44 so as to be in line with the beam 4, the beam 46 being of similar construction to said beam 4. A tubular frame beam 47 that extends parallel to the beam 44 just mentioned has its leading end secured to the end of the beam 46 remote from the beam 4. The rearmost end of the beam 47 remote from the beam 46 carries a support 48 for a castor ground wheel 49. The level of the axle of the castor ground wheel 49 relative to that of the support 48 can be adjusted in known manner with the aid of mechanism which includes a screwthreaded spindle 50 and an adjustable locking member 51 of known construction can be employed to retain the plane of rotation of the castor ground wheel 49 in any one of three different angular settings relative to the frame of the tedder.

Figure 5:
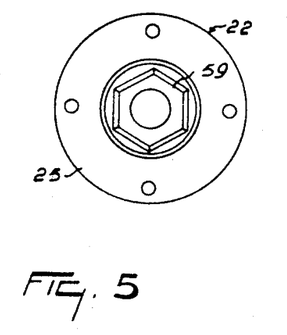
FIGURE 5 is a scrap elevation as seen in the direction indicated by the arrow V of FIGURE 2 but with certain of the parts that are illustrated in FIGURE 2 removed.

The frame portion 1 accommodates a drum-shaped body 52 the substantially horizontal axis of rotation of which is afforded by a tube 53 (FIGURE 2) that is substantially coaxial with the aforementioned tube 28. The end of the tube 53 which is closest to the central frame portion 2 has a flange 54 against which bears a thin circular plate 55. The plate 55 is sandwiched between the flange 54 and the flange 56 of a coupling member 57, bolts 58 being employed to secure the parts 54, 55 and 56 to one another. The end of the coupling member 57 remote from the tube 53 takes the form of a boss 59 (FIGURES 2 and 5) of hexagonal cross-section. The six faces of the boss 59 and the six junctions between said faces are of curved configuration as can be seen best in FIGURE 2 of the drawings, the centers of curvature being substantially coincident with the longitudinal axis of the coupling member 57 which axis is itself coincident with that of the tube 53. The boss 59 is disposed internally of a matchingly shaped recess of the holder 22. The end of the tube 53 remote from the coupling member 57 is provided with a supporting member (not shown) which is journalled in a bearing carried by the frame beam 47. The supporting member and bearing which have just been mentioned co-operate in such a way that axial displacement of the tube 53 is prevented.

The thin circular plate 55 and a similar plate located at the opposite end of the tube 53 are formed towards their radially outermost edges with holes through which tubular tine supports 60 are turnably entered so as to extend parallel to the tube 53. As can be seen in FIGURE 2 of the drawings, bolts 61 are entered transversely through the tine supports 60 and serve to clamp pairs of spring steel tines 62 to said supports 60. Each support 60 carries a projecting bracket 63A in which a spring-loaded locking pin 63 is mounted. The tip of each locking pin 63 can be entered in any one of a number of different holes formed in the plate 55 at equal distances from the tine support 60. It will be evident that the particular hole which is chosen for co-operation with each locking pin 63 determines the angular setting of each tine support 60 about its own longitudinal axis and thus the angles of attack of the tines 62 that are carried by that support. Similar means is preferably employed to enable the angles of attack of the tines carried by the tubular tine supports 30 of the body 31 to be adjusted. A plate 64 which is symmetrically identical to the previously described plate 36 that can be seen in FIGURE 2 of the drawings surrounds the end of the body 52 that is closest to the body 31.

A hood-shaped baffle 65 of generally similar construction and arrangement to the previously described baffle 32 surrounds an upper region of the body 52. However, in this case, the side or end of the baffle 65 which is remote from the central frame portion 2 is wholly perpendicular to the axis of rotation of the body 52 afforded by the tube 53. As can be seen in FIGURE 1 of the drawings, the rearmost edge of the baffle 65 is provided with parts that are substantially identical to the previously described parts 37 to 42 and which are denoted by the same reference numerals as those parts. The end of the L-section beam 37 remote from the central frame portion 2 is supported by an upwardly and rearwardly projecting beam 66 the lowermost end of which is rigidly secured to the upper side of the frame beam 47.

Two supports 67 and 68 (FIGURE 1) project forwardly from the frame beam 46 of the frame portion 1 and carry a hollow casing 69 that extends parallel to the frame beam 46. One end of the casing 69 is located adjacent the U-shaped support 11 of the draw-bar 12 and this end carries a gear casing 70 from the front side of which an input shaft 71 projects parallel (in the plan view of FIGURE 1) to the draw-bar 12. An intermediate telescopic transmission shaft 72 having universal joints at its opposite ends is employed to place the input shaft 71 in driven communication with the power take-off shaft of an agricultural tractor or other vehicle which is used to propel the tedder over the ground during working thereof. The construction of the transmission shaft 72 is such that, when the tedder is not in use, the universal joint at the end of the shaft which is remote from the gear casing 70 can be retained in engagement with a bracket 73 carried by the casing 69. Pinions located internally of the gear casing 70 transmit drive from the input shaft 71 to a relatively perpendicular output shaft 74 that extends internally of the hollow casing 69. The end of the output shaft 74 that is remote from the gear casing 70 carries a triple pulley 75 which is linked by three belts, ropes or the like 76 to a further larger triple pulley 77 mounted at the end of the tube 53 that is closest to the frame beam 47. The parts 75, 76 and 77 are preferably shielded by a protective casing which is not illustrated in the drawings. Two vertical supports 78 project from the side of the frame beam 47 a short distance to the rear of its junction with the beam 46. As shown in broken lines in FIGURE 1 of the drawings, the horizontal pivot pin 13 of the draw-bar 12 can be removed from the U-shaped support 11 and entered through aligned holes formed in the two vertical supports 78 to pivotally connect the draw-bar 12 to the frame beam 47.

Figure 4:
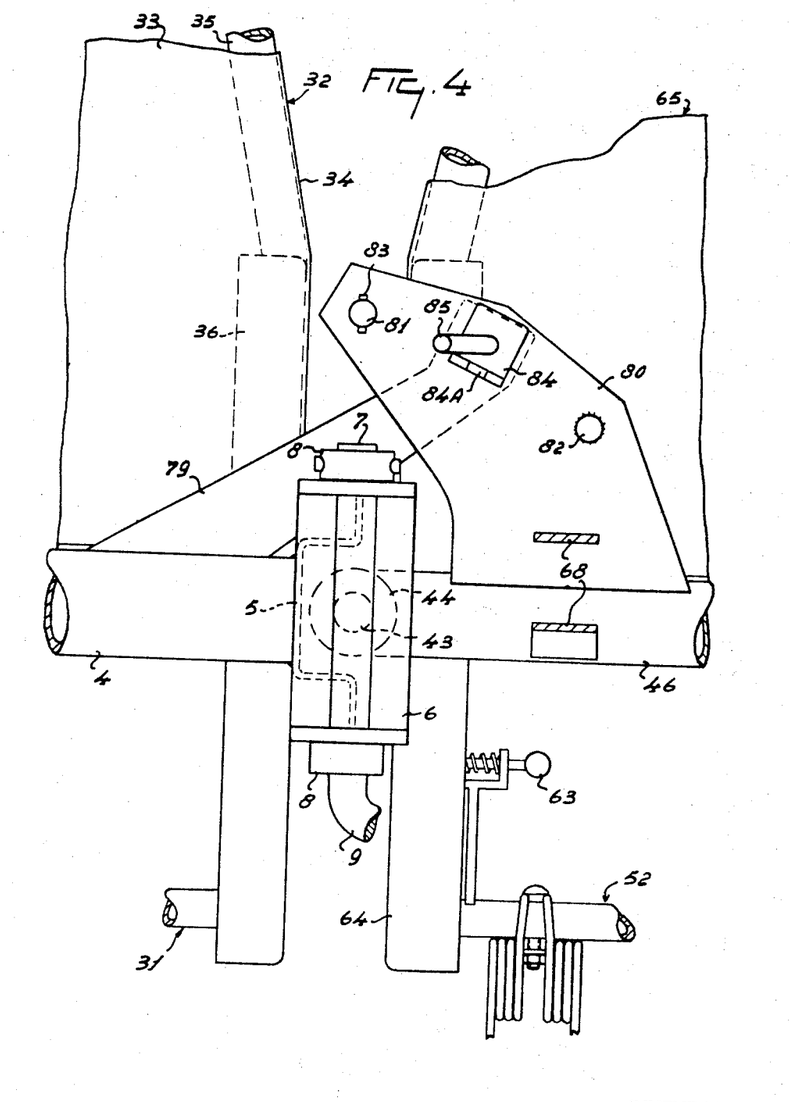
FIGURE 4 is a partial front elevation as seen in the direction indicated by the arrow IV of FIGURE 2.

The end of the beam 4 that is closest to the frame portion 1 carries a plate 79 (FIGURE 4) that is contained in a vertical plane. The plate 79 is inclined upwardly from the beam 4 towards the frame portion 1 and, as can be seen in FIGURES 2 and 4 of the drawings, has its uppermost end located between a pair of vertical plates 80 that are secured to the frame beam 46 of the frame portion 1. The uppermost end of the plate 79 lies between two pins 81 and 82 each of which pins extends transversely between the two plates 80. Small transverse retaining pins 83 are entered through opposite ends of the pin 81 to prevent its axial displacement while the pin 82 is welded to both plates 80. The foremost plate 80 carries a bracket 84 in which a spring-loaded locking pin 85 is mounted. In the position of the various parts that is illustrated in FIGURES 2 and 4 of the drawings, the tip of the locking pin 85 is entered through holes formed in both plates 80 and through a hole formed in the free end of the intervening plate 79. However, the locking pin 85 may be retracted and retained in a retracted setting by engaging its handle in a notch 84A of the bracket 84. In this position of the locking pin 85, the plate 79 can move to and fro between the stops afforded by the pins 81 and 82.

The tubular beam 44 which is coupled to the frame beam 5 located closest to the frame portion 3 forms part of the latter frame portion. A frame beam 86 of similar construction to the beams 4 and 46 is secured to the leading end of the last-mentioned tubular beam 44 and extends substantially coaxially with the beams 4 and 46. A frame beam 87 (FIGURE 1) projects perpendicularly rearwardly from the end of the frame beam 86 remote from the central frame portion 2. The rearmost end of the frame beam 87 carries a support 88 for a castor ground wheel 89 the level of the axle of which relative to the level of the support 88 can be varied by an adjusting mechanism of known construction that includes a screw-threaded spindle 90. The plane of rotation of the castor ground wheel 89 can be retained in any one of a number of different angular settings relative to the frame of the tedder with the aid of an adjustable locking member 91 of known construction.

The frame portion 3 houses a rotable drum-shaped body 92 having a central tube which is in driven connection with the central tube 28 of the body 31 in a substantially identical manner to that which can be seen in FIGURE 2 in respect of the construction between the tubes 52 and 28. An upper region of the body 92 is surrounded by a hood-shaped baffle 93 of symmetrically identical construction to the previously described baffle 65. The baffle 93 is provided with parts 37 to 42 of symmetrically identical construction and arrangement to the parts 37 to 42 carried by the baffle 65. The frame beams 4 and 86 of the two frame portions 2 and 3 are interconnected by parts symmetrically identical to the previously described parts 79 to 85 that interconnect the frame beams 4 and 46 of the frame portions 2 and 1.

In the use of the tedder which has been described, the draw-bar 12 occupies the position shown in full lines in FIGURE 1 and its leading end is coupled to the tow-bar or the like of an agricultural tractor or other propelling vehicle. The universal joint at the leading end of the transmission shaft 72 is placed in driven connection with the power take-off shaft of the same propelling vehicle. The tedder is then moved over the ground in the direction A with the drum-shaped body 52 being rotated by drive transmitted to it through the input shaft 71, output shaft 74 and belts, ropes or the like 76. Drive is transmitted from the body 52 to the body 31 and from the body 31 to the body 92 by way of the coupling members 57 and holders 22 that have been described and which can be seen in FIGURE 2 of the drawings. The directions of rotation of the bodies 31, 52 and 92 is such that tines 62 in lowermost regions thereof move forwardly over the ground relative to the direction of travel A. Thus, cut crop which is engaged by the tines 62 is moved upwardly and forwardly in front of the bodies 31, 52 and 92 and is discharged rearwardly of the tedder from beneath the rearmost edges of the baffles 32, 65 and 93. Some of the discharged crop contacts the guide rods 42 and the whole of the discharged crop is deposited on the ground in the form of three relatively spaced swaths or windows. The dimensions of the tedder which has been described are such that it can work simultaneously, in one traverse, three neighboring swatchs of crop that have previously been cut by a five feet wide mowing beam.

Figure 3:
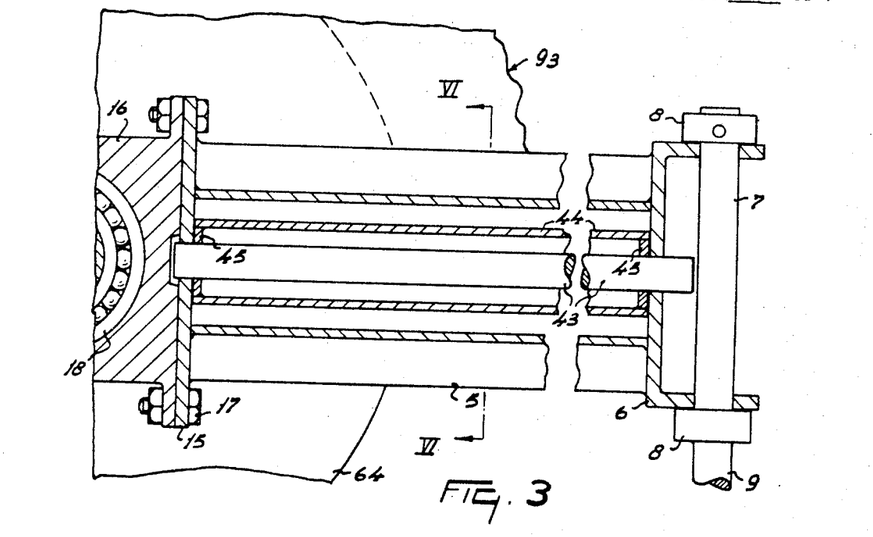
FIGURE 3 is a part-sectional view of certain parts of the tedder as seen in the direction indicated by the arrows III—III of FIGURE 2.
Figure 6:
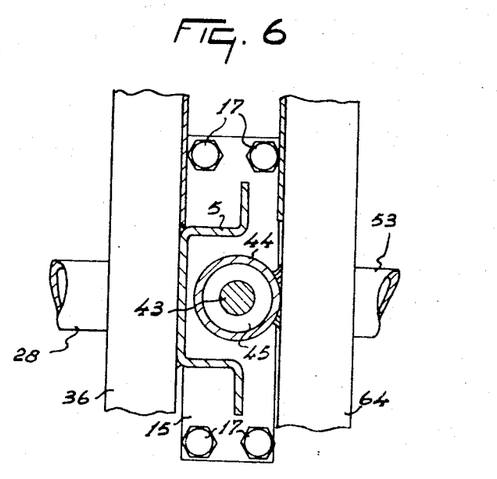
FIGURE 6 is a section taken on the line VI—VI of FIGURE 3, FIGURE 7 corresponds generally to FIGURE 4 but shows an alternative embodiment of certain parts of the tedder.

The locking pins 85 occupy their inoperative positions in which their handles 85 are engaged in the retaining notches 84A so that the three frame portions 1, 2 and 3 can turn relative to one another about the substantially horizontal axes afforded by the two shafts 43, said shafts extending substantially parallel to the direction A. The inclined portions of the side walls 34 of the baffles 32, 65 and 93 allow turning movements without any danger of said side walls 34 fouling one another. In this connection, it will be remembered that the pins 81 and 82 allow only a limited degree of pivotal movement about the shafts 43. The degree of pivotal movement is, however, sufficient to enable the tedder to match all the undulations in the surface of the ground which it is likely to meet with during its use. It will be noted that the pins 81 are removable from the plates 83 to assist in connecting and disconnecting the frame portions 1, 2 and 3 without difficulty. Upon removal of the pins 81, the plates 79 can be slid outwardly or inwardly between the plates 80 without the need for any lifting. The drive connections between the bodies 52, 31 and 92 are constructed to enable them to match pivotal movements about the shafts 43. In addition to the centers of curvature of the curved faces of the hexagonal bosses 59 being coincident with the axes of rotation of the bodies 52 and 92, it will be evident from FIGURE 2 of the drawings that said centers of curvature also substantially coincide with the longitudinal axes of the corresponding shafts 43. Since, as can be seen in FIGURE 3, the load-bearing points of each shaft 43 are spaced apart from one another by a substantial distance and since, as can be seen in FIGURE 6, the frame beams 5 and 44 of neighbouring frame portions partially surround one another, a simple, compact and rugged structure is obtained.

The gear casing 70 is located close to the draw-bar 12 so that the transmission shaft 71 can be driven by the power take-off shaft of the same agricultural tractor or other vehicle which tows the tedder over the ground. The gear casing 70 is rigidly secured to the frame portion 1 and drive is transmited from it to the body 52 in a very simple manner. As previously described, the angle of attack of the tines 62 can be changed to best suit the prevailing working conditions by turning the tubular tine supports 30 and 60 about their own longitudinal axes with the aid of the brackets 63A, the locking pins 63 being employed to maintain the chosen settings. The positions of the guide rods 42 can also be changed by turning the supporting members 40 about the inclined pivot pins 39 and employing the locking pins 41 to maintain the chosen settings. If desired, all the guide rods 42 can be turned upwardly through approximately 180° about the pivot pins 39 to bring them to inoperative positions over and above the baffles 32, 65 and 93, the apertured plates 38 preferably being provided with holes (not shown in the drawings) that co-operate with the locking pins 41 to retain the rods 42 in the inoperative positions just mentioned. When the guide rods 42 occupy their inoperative positions, discharged crop will be unaffected thereby and will fall to the ground throughout the working width of the tedder.

Figure 7:
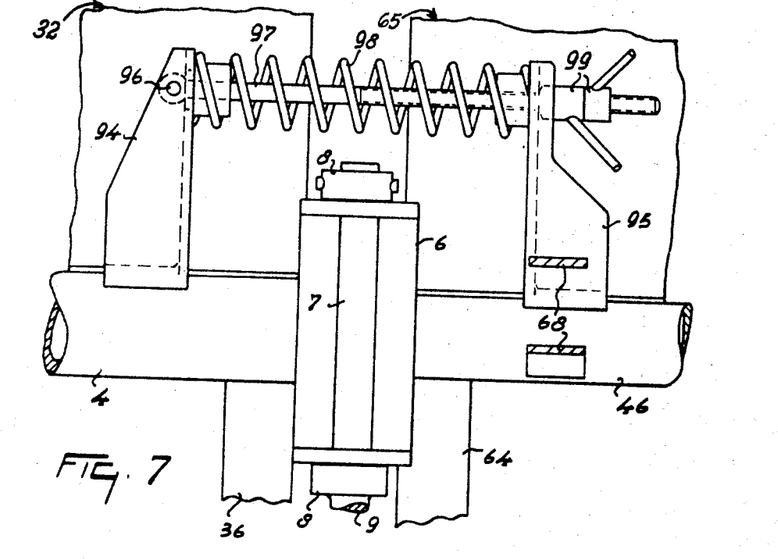

Under some circumstances, it is advantageous to provide weights at the ends of the two frame beams 46 and 86 that are remote from the central frame portion 2. These weights ensure firm contact of the ground wheels 49 and 89 with the ground surface and tend to prevent unnecessary movements of the frame portions about the pivotal joints afforded by the shafts 43. As an alternative to the provision of the weights which have just been described, the construction which is illustrated in FIGURE 7 of the drawings may be employed. The parts 79 to 85 that are illustrated in FIGURE 4 of the drawings are present in the embodiment illustrated in FIGURE 7 but are not illustrated for the sake of clarity. As can be seen in FIGURE 7, the neighbouring ends of the frame beams 4 and 46 carry upstanding brackets 94 and 95, the bracket 94 supporting a substantially horizontal pivot pin 96 that extends parallel to the shafts 43. A rod 97 that extends perpendicular to the pin 96 is turnably mounted on said pin so as to project from the pin 96 through a hole in the bracket 94 and through a hole in the bracket 95. Locating bosses are provided around the two holes just mentioned on the relatively facing sides of the brackets 94 and 95 and a helical compression spring 98 the opposite ends of which are located by said bosses surrounds the rod 97 between the brackets 94 and 95. That portion of the rod 97 which is entered through the hole in the bracket 95 is screw-threaded and a pair of nuts 99 are mounted on the screw-threaded end of the rod 97 which projects to the side of the bracket 95 remote from the bracket 94. Similar parts are arranged between the frame portions 2 and 3. The nuts 99 can be moved axially of the rods 97 to adjust the degree of compression of the two springs 98. It will be apparent that the two springs 98 will tend to turn the frame portions 1 and 3 downwardly about the shafts 43 relative to the central frame portion 2 so that the same effect is achieved as by the use of the aforementioned weights.

When the tedder is to be moved from one place to another without performing any working operation, the locking pins 85 are moved to their operative settings in which their tips are entered through the holes formed in the free ends of the plates 79 so that the three frame portions 1, 2 and 3 are no longer capable of turning relative to one another about the shafts 43. The plane of rotation of the ground wheel 89 is angularly adjusted through 90° relative to the position which is shown in FIGURE 1, the new position being maintained by the locking member 91. The locking member 51 for the ground wheel 49 is rendered inoperative so that said ground wheel becomes a free caster wheel. The draw-bar 12 is disconnected from the support 11 and brought to the position illustrated in broken lines in FIGURE 1 in which it is coupled to the two supports 78. The guide rods 42 are brought to their previously described inoperative positions over and above the baffles 32, 65 and 93. The tedder can then be towed in a direction approximately parallel to the tubes 28 and 53 and it will be apparent that its path of travel will have been reduced to an extent sufficient to enable it to negotiate gateways, public roads and the like without much difficulty or danger. The tedder is quite stable in its transport position since it has the ground wheels 10 well spaced to one side and the ground wheels 49 and 89 well spaced to the opposite side of its centre of gravity.

Figure 8:
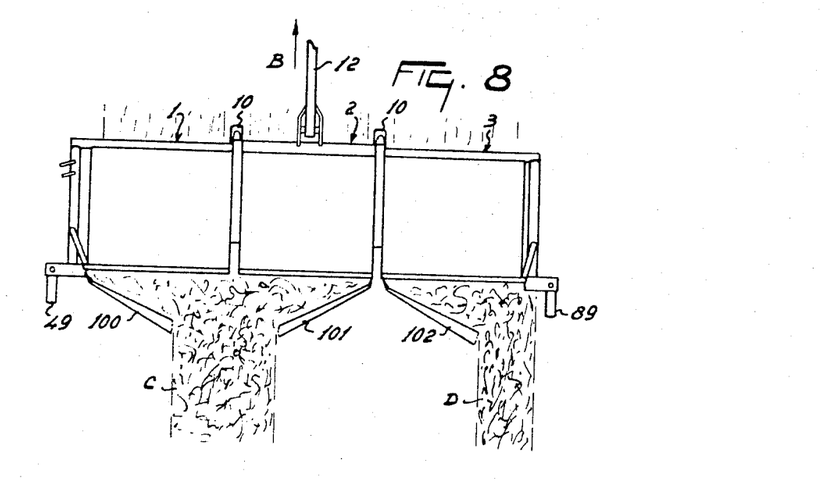
FIGURE 8 is a plan view, to a reduced scale, corresponding to FIGURE 1 but showing the tedder in operation and fitted with guide members for discharged crop differing in construction to those illustrated in FIGURE 1.

FIGURE 8 of the drawings diagrammatically illustrates a working arrangement of the tedder which has been described in which the guide members for discharged crop that are afforded by the guide rods 42 are replaced by three different guide members 100, 101 and 102. The crop guide members 100 and 101 are located at the relatively remote ends of the beams 37 of the frame portions 1 and 2 in such a way that they converge rearwardly of the tedder. The guide member 102, on the other hand, is mounted at the end of the beam 37 of the frame portion 3 which is closest to the central frame portion 2 but is arranged so that it diverges rearwardly of the tedder relative to the adjacent guide member 101. It will be apparent from FIGURE 8 of the drawings that the guide rods of the three guide members 100 to 102 are much longer than the guide rods 42 that have previously been described and that the distances between their free and mounted ends are greater than half the working widths of the frame portions with which the three guide members are respectively associated. The remaining three positions which, in FIGURE 1, are occupied by guide members afforded by guide rods 42, are left free of such guide members in the arrangement illustrated in FIGURE 8. Alternatively, such guide members may remain attached to the tedder but occupying their previously described inoperative positions.

The working arrangement illustrated in FIGURE 8 allows crop lying on the ground in the form of six adjacent but relatively spaced mown swaths to be formed into three larger swaths or windrows in only two traverses of a field. When the tedder makes its first traverse in the direction indicated by the arrow B in FIGURE 8, two neighbouring mown swaths are dealt with by the frame portions 1 and 2, the tedded crop being collected centrally together into one large swath or windrow C by the two crop guide members 100 and 101. The frame portion 3 deals with the next neighbouring mown swath and its guide member 102 gathers the tedded crop together into a swath or windrow D which is deposited on the ground at the extreme right-hand side of the path of travel of the tedder. During the next return traverse of the tedder in a direction opposite to the direction B, it deals with the next three neighbouring mown swaths forming another large swath or windrow C and another smaller swath or windrow D. However, the second swath or windrow D falls to the ground alongside the first swath or windrow D so that, at the end of the second traverse, two large swaths or windrows C and one intervening large swath or windrow D have, in effect, been formed. In addition to having a greater length than the guide members afforded by the guide rods 42, the guide members 100, 101 and 102 are inclined to the axes of rotation of the corresponding bodies (in plan view) at a much smaller angle than are the previously described guide rods 42.

Figure 9:
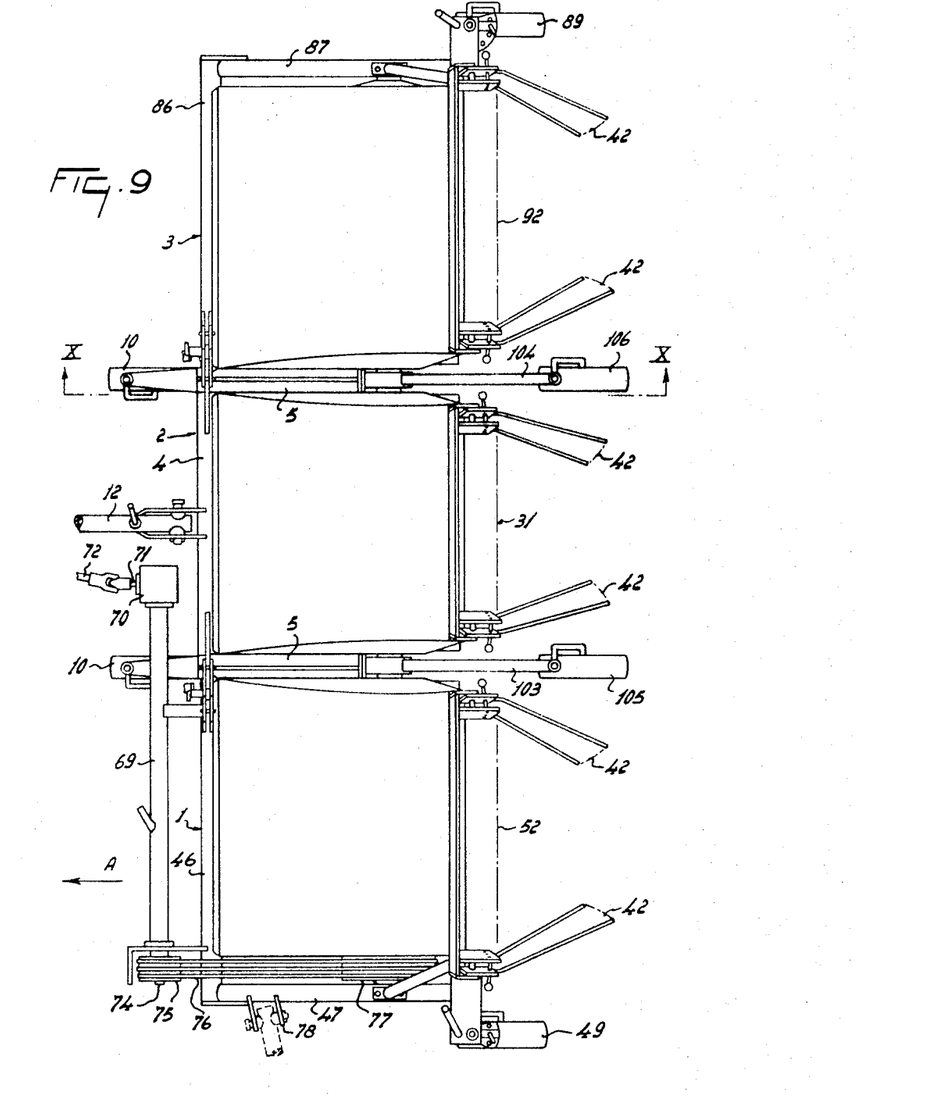
FIGURE 9 is a plan view of a further embodiment of the tedder according to the invention.
Figure 10:
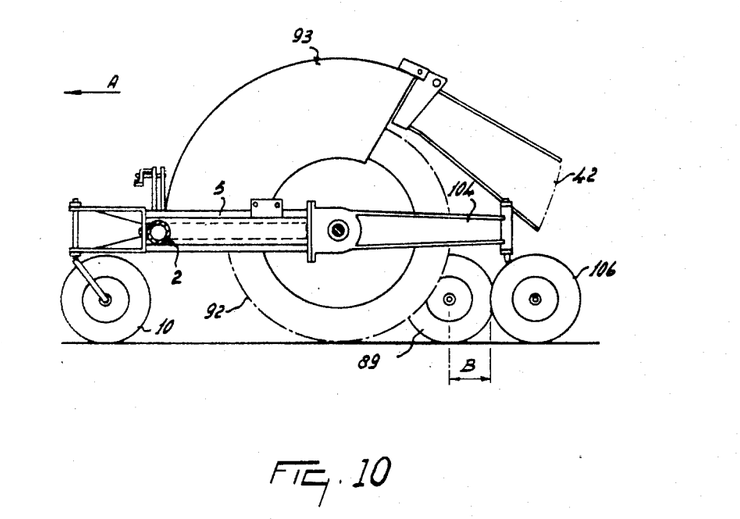
FIGURE 10 is a section taken on line X—X in FIGURE 9.

The tedder shown in FIGS. 9 and 10 corresponds largely with the tedder described with respect to FIGS. 1–8. In this embodiment each frame beam 5 is provided with frame beams 103 and 104. The element 2 is supported from the two ground wheels 10 and, moreover, from two ground wheels 105 and 106, which are attached to the frame beams 103 and 104 respectively. The ground wheels 105 and 106 are caster wheels. The ground wheels 10 are located in this embodiment at a given distance in front of the tined drum 31, so that crop cannot be accumulated around the ground wheels. It is desirable for the ground wheels to be located, on plan, in operation, completely in front of the frame beam 4 of the element 2. The ground wheels 105 and 106 are also arranged at a given distance B from the tined drum 31 (see FIG. 10) and this distance B is preferably at least approximately equal to the radius of a ground wheel with respect to the rear boundary of the reel.

The ground wheels 105 and 106, which are arranged like the ground wheels 10, so that they travel on the strip of land between two adjacent portions, are freely pivotable without being hindered by the guide members 42.

From FIG. 10 the disposition of the ground wheels with respect to the frame will be evident and it will be apparent, in particular, that the distance of the ground wheels from the tined reel 5 is fairly large.

Although in this embodiment the tedder comprises a central element 2, which is supported from four ground wheels, the central element may, as an alternative, be supported from three ground wheels, so that for example one of the ground wheels 10 is located centrally in front of the element. The disposition of the ground wheels at a given distance in front of the frame beam 4 is also important, if ground wheels 105 or 106 were not provided.

The disposition of the ground wheels 10, 105 and 106 is such that they do not affect adversely the satisfactory operation of the tedder and provide a stable support of the implement.

It is within the scope of the invention to provide a tedder having only two frame portions rather than the three which have been described and, in this connection, it is pointed out that the term "tedder" has been used for the sake of convenience and that the machine described and illustrated in the accompanying drawings is an implement for working crop lying on the ground provided with tined drums, however certain features of the invention are also applicable to implements in which crop or soil working members other than the tined bodies 31, 52 and 92 are mounted in the frame portions 1, 2 and 3.

What I claim is:

1. In an agricultural implement having a frame supported on ground wheels, said frame including a plurality of portions two of which are pivotably linked to turn relative to one another about a pivotable axis, the combination of one of said portions including a substantially horizontally extending frame beam of channel-shaped cross section providing substantially parallel limbs, the second of said portions having a frame beam adjacent and channel-shaped frame beam and extending between said limbs substantially parallel to said channel-shaped frame beam, said axis about which said portions are pivotable also extending between said limbs.

2. The implement of claim 1, wherein said frame beam of said second portion extending between the limbs of the channel-section frame beam being tubular and of circular cross section with its longitudinal axis coinciding with the axis about which the two frame portions are relatively pivotable.

3. The implement of claim 2, wherein the axis about which the two frame portions pivot being a shaft, shaft support members positioned on said frame adjacent the opposite ends of the two adjacent frame beams and said shaft abutting against parts of said frame to prevent its axial displacement.

4. The implement of claim 3, wherein one end of one of the two adjacent frame beams that are interconnected by the pivotal shaft carries a bearing supporting a crop-working member mounted on a frame portion, said bearing comprising a part that prevents axial displacement of the pivotal shaft in one direction and another end of one of the two frame beams interconnected by the pivotal shaft supporting a substantially vertical mounting shaft of a ground wheel, said substantially vertical shaft comprising a second part that prevents displacement of the pivotal shaft in the opposite direction.

5. The implement of claim 1, wherein stops are provided to limit the relative pivotal motion of the frame portions and another end of one of the two frame beams interconnected by the pivotal shaft supporting a substantially vertical mounting shaft of a ground wheel, said substantially vertical shaft comprising a second part that prevents displacement of the pivotal shaft in the opposite direction.

6. An agricultural implement having a frame supported on ground wheels, said frame having portions pivotably connected to one another side by side, each frame portion including a driving shaft for a corresponding crop-working member, said shafts having neighboring ends located near the axis about which said two frame portions are relatively pivotable, bearing means drivingly interconnecting and supporting said shaft in the region of said interconnection, the interconnection between said two driving shafts being intersected by the axis about which the corresponding two frame portions are relatively pivotable.

7. The implement of claim 6, wherein the end of one driving shaft is journalled in a recess provided at the end of the other driving shaft and said end having a non-circular cross section and the recess in which it is entered being correspondingly shaped.

8. An agricultural implement having a frame supported on ground wheels, said frame having three frame portions and a drawbar which is adapted to be connected to the central portion during working operation, crop-working members mounted in the three frame portions, said members being drivingly interconnected and being driven from one side of the implement, a driving mechanism linked to a gear casing disposed adjacent said drawbar, said driving mechanism being carried by one of the two frame portions which flanks the central portion and being in driven connection with the power take-off shaft of a prime mover.

9. The implement of claim 8, wherein a further casing carried by a flanking frame portion is rigidly connected to said gear casing, said further casing projecting from the flanking frame portion to the region of the drawbar connected to said central portion, said further casing being a hollow tube in which an output shaft of said gear casing is journalled, said output shaft extending from the gear casing to one side of the implement.

10. The implement of claim 9, wherein the end of the output shaft remote from the gear casing is linked by a belt transmission to the crop-working member mounted in said flanking frame portion.

11. An implement for working crop lying on the ground comprising a frame movable over the ground and at least one drum-shaped crop-working body rotatably mounted on said frame, guide members for discharged crop being arranged at the rear of the implement relative to its intended direction of operative travel for depositing crop on a strip of land whose width is smaller than the working width of the implement, said guide members being adjustable whereby the working width of said implement is sufficient to work simultaneously three swaths of mown crop and merge two of said mown swaths into a single large swath while displacing the third swath laterally so that it is deposited behind the implement at one side thereof.

12. The implement of claim 11, wherein the guide members for discharged crop are arranged to deposit a large swath on a strip of land disposed approximately centrally between the two strips of land occupied by the mown swaths from which the large swath is formed.

13. The implement of claim 11, wherein the implement comprises three frame portions each of which includes a corresponding rotatable drum-shaped crop-working body, the three frame portions being arranged whereby the axes of rotation of the three crop-working bodies are coincident, said three frame portions being pivotally interconnected, the two pivotal axes connecting same extending between the crop-working bodies and being substantially perpendicular to the axes of rotation of said bodies.

14. The implement of claim 13, wherein each guide member for discharged crop is secured to one of the frame portions at a location adjacent the end of the corresponding body, said guide member projecting from its mounting point beyond the center of the corresponding body.

15. The implement of claim 13, wherein each crop-working body includes tine supports which are angularly adjustable about axes extending parallel to the axis of rotation of that body, locking means provided on said portions to retain said tine supports in chosen angular settings about said axes.

References Cited

UNITED STATES PATENTS

| | | | |
|---|---|---|---|
| 2,916,869 | 12/1959 | Edwards | 56—372 |
| 3,059,403 | 10/1962 | Bamford et al. | 56—372 X |
| 3,188,789 | 6/1965 | Van der Lilly | 56—372 |
| 3,342,025 | 9/1967 | Van der Lilly | 56—372 |

FOREIGN PATENTS

| | | |
|---|---|---|
| 1,354,278 | 1/1964 | France. |
| 825,631 | 12/1959 | Great Britain. |

LUCIE H. LAUDENSLAGER, *Primary Examiner.*